(12) United States Patent
Chong et al.

(10) Patent No.: US 10,585,644 B2
(45) Date of Patent: Mar. 10, 2020

(54) INTEGRATED QUANTUM-RANDOM NOISE GENERATOR USING QUANTUM VACUUM STATES OF LIGHT

(71) Applicant: QuintessenceLabs Pty Ltd., Deakin (AU)

(72) Inventors: Ken Li Chong, Deakin (AU); Andrew Lance, Deakin (AU)

(73) Assignee: QuintessenceLabs Pty Ltd., Deakin (AU)

( * ) Notice: Subject to any disclaimer, the term of this patent is extended or adjusted under 35 U.S.C. 154(b) by 0 days.

(21) Appl. No.: 15/951,110

(22) Filed: Apr. 11, 2018

(65) Prior Publication Data
US 2018/0232208 A1    Aug. 16, 2018

Related U.S. Application Data

(62) Division of application No. 14/362,869, filed as application No. PCT/AU2012/001503 on Dec. 7, 2012, now Pat. No. 9,965,250.

(Continued)

(51) Int. Cl.
*G06F 7/58* (2006.01)
*G06N 10/00* (2019.01)
(Continued)

(52) U.S. Cl.
CPC ............ *G06F 7/588* (2013.01); *G01J 1/0425* (2013.01); *G01J 1/0459* (2013.01); *G01J 1/1626* (2013.01); *G06N 10/00* (2019.01)

(58) Field of Classification Search
CPC ...... G01J 1/0425; G01J 1/0459; G01J 1/1626; G06F 7/588; G06N 99/002
See application file for complete search history.

(56) References Cited

U.S. PATENT DOCUMENTS 6,218,973 B1 * 4/2001 Barrett, Jr. .............. G06F 7/588
                                                     341/143
7,284,024 B1   10/2007 Trifonov et al.
(Continued)

FOREIGN PATENT DOCUMENTS

EP     2788863 A1   10/2014
WO     2011023501 A1   3/2011
WO     2013082672 A1   6/2013

OTHER PUBLICATIONS

U.S. Appl. No. 14/362,869, "Final Office Action", dated Oct. 20, 2017, 8 pages.

(Continued)

*Primary Examiner* — Thomas A Hollweg
*Assistant Examiner* — Mary A El-Shammaa
(74) *Attorney, Agent, or Firm* — Kilpatrick Townsend & Stockton LLP

(57) ABSTRACT

An integrated quantum random noise source includes a substrate, an optical oscillator that may be integral to the substrate coupled by an optical waveguide to an optical directional coupler. The optical directional coupler has two outputs that are coupled by optical waveguides to a pair of photodetectors that are part of a balanced photodetector. The balanced photodetector in response outputs an analogue signal proportional to the difference in photocurrents of the two photodetectors. The analogue output signal from the balanced photodetector is a random Gaussian-distributed signal representative of quadrature measurements on the quantum vacuum state of light. The random noise source can be coupled other apparatus to provide a source of random bits.

18 Claims, 4 Drawing Sheets

Related U.S. Application Data

(60) Provisional application No. 61/568,035, filed on Dec. 7, 2011.

(51) Int. Cl.
*G01J 1/04* (2006.01)
*G01J 1/16* (2006.01)

(56) References Cited

U.S. PATENT DOCUMENTS

| | | | | |
|---|---|---|---|---|
| 8,428,102 | B2* | 4/2013 | Chester | H04J 13/0018 |
| | | | | 375/140 |
| 8,909,003 | B1* | 12/2014 | Hochberg | G02F 1/011 |
| | | | | 385/12 |
| 9,965,250 | B2 | 5/2018 | Chong et al. | |
| 2004/0183530 | A1* | 9/2004 | Butters | G01N 37/005 |
| | | | | 324/248 |
| 2005/0098773 | A1* | 5/2005 | Vion | B82Y 10/00 |
| | | | | 257/9 |
| 2007/0222541 | A1* | 9/2007 | Naito | H03H 9/02259 |
| | | | | 333/186 |
| 2008/0212448 | A1* | 9/2008 | Padiy | G11B 7/0903 |
| | | | | 369/100 |
| 2009/0156659 | A1* | 6/2009 | Butters | G01N 37/005 |
| | | | | 514/449 |
| 2009/0167439 | A1* | 7/2009 | Zhan | H03F 1/26 |
| | | | | 330/302 |
| 2009/0232191 | A1* | 9/2009 | Gupta | H04L 27/2096 |
| | | | | 375/216 |
| 2010/0303476 | A1 | 12/2010 | Barton et al. | |
| 2011/0047545 | A1* | 2/2011 | Ellison | G06F 7/588 |
| | | | | 718/1 |

OTHER PUBLICATIONS

U.S. Appl. No. 14/362,869, "Non-Final Office Action", dated Mar. 23, 2017, 8 pages.

U.S. Appl. No. 14/362,869, "Notice of Allowance", dated Jan. 11, 2018, 8 pages.

U.S. Appl. No. 14/362,869, "Restriction Requirement", dated Apr. 15, 2016, 6 pages.

EP12854880.7, "Extended European Search Report", dated Mar. 28, 2017, 12 pages.

Jalali, et al., "Guided-wave optics in silicon-on-insulator technology", IEE Proceedings: Optoelectronics, Institution of Electrical Engineers, Stevenage, GB, vol. 143, No. 5, Oct. 22, 1996, pp. 307-311.

Jennewein, et al., "A Fast and Compact Quantum Random Number Generator", Review of Scientific Instruments, vol. 71, Issue 4, Dec. 1999, pp. 1675-1698.

PCT/AU2012/001503, "International Preliminary Report on Patentability", dated Jun. 10, 2014, 5 pages.

PCT/AU2012/001503, "International Search Report & Written Opinion", dated Feb. 11, 2013, 8 pages.

Qi, et al., "High-Speed Quantum Random Number Generation by Measuring Phase Noise of a Single-Mode Laser", Optics Letters, vol. 35, No. 3, Feb. 2010, 3 pages.

Sheng, et al., "InGaAs PIN photodetectors integrated on silicon-on-insulator waveguides", Jan. 18, 2010, pp. 1756-1761.

Symul, et al., "Real time demonstration of high bitrate quantum random number generation with coherent laser light", Applied Physics Letters, American Institute of Physics, US, vol. 98, No. 23, Jun. 7, 2011, 3 pages.

Tisa, et al., "One-chip quantum random number generator", Quantum Communications Realized II, Proc. of SPIE, vol. 7236, Jan. 24, 2009, 10 pages.

Vivien, et al., "Polarization-independent single-mode rib waveguides on silicon-on-insulator for telecommunication wavelengths", Optics Communications, North-Holland Publishing Co. Amsterdam, NL, vol. 210, No. 1-2, Sep. 1, 2002, pp. 43-49.

W. Fang, et al., "A distributed feedback silicon evanescent laser References and links", Opt. Express Opt. Express Opt. Express Opt. Express International Semiconductor Laser Conference Opt. Express 10. M. N. Sysak Opt. Express, Jan. 1, 2006, pp. 9203-9210.

* cited by examiner

INTEGRATED QUANTUM-RANDOM NOISE GENERATOR USING QUANTUM VACUUM STATES OF LIGHT

CROSS-REFERENCES TO RELATED APPLICATIONS

This application is a divisional of U.S. Non-Provisional patent application Ser. No. 14/362,869, filed on Jun. 4, 2014, now U.S. Pat. No. 9,965,250 B2 issued on May 8, 2018 entitled "INTEGRATED QUANTUM-RANDOM NOISE GENERATOR USING QUANTUM VACUUM STATES OF LIGHT," which is a National Stage Entry of International Patent Application No. PCT/AU2012/001503, filed on Dec. 7, 2012, entitled "INTEGRATED QUANTUM-RANDOM NOISE GENERATOR USING QUANTUM VACUUM STATES OF LIGHT," which claims priority from U.S. Provisional Patent Application No. 61/568,035, filed on Dec. 7, 2011, entitled: "INTEGRATED QUANTUM-RANDOM NOISE GENERATOR USING QUANTUM VACUUM STATES OF LIGHT," the disclosures of all of which are hereby incorporated by reference in their entirety for all purposes.

BACKGROUND OF THE INVENTION

This invention relates to random noise generators, and in particular to quantum-random number generation. The invention has uses in quantum random noise, number, and bit generation; nondeterministic random noise, number, and bit generation; entropy sources; cryptographic key generation; symmetric and asymmetric cryptography; and more generally in cryptography.

Hardware random number generators are known which produce random numbers that are derived from physical processes. For example, one known technique relies upon a hash function run against a frame of a video stream from an unpredictable source. Another random number source uses variations in the amplitude of atmospheric noise recorded with a normal radio.

Quantum-random number generators are also known. Quantum-random number generators derive random numbers from measurements conducted on quantum processes or quantum systems. The uniqueness and randomness of the outcomes of these measurements are of quantum origin as described by the laws of quantum physics. Known quantum processes or quantum systems from which quantum-random numbers can be derived include, for example, Johnson-Nyquist shot noise, or radiation from nuclear decay. Measurement outcomes derived from measurements made on quantum states of light are another example of a source of quantum-random numbers.

BRIEF SUMMARY OF THE INVENTION

This invention provides an integrated quantum vacuum state of light-based quantum-random noise source. It also provides a random bit generator which uses the quantum vacuum state of light-based quantum-random noise source as its source of entropy.

In a preferred embodiment, a quantum random noise source includes an optical oscillator. The optical oscillator, typically a laser, may be integral on a substrate, or separate from the substrate. The oscillator typically comprises a semiconductor laser which is coupled by a waveguide to an optical directional coupler which divides the input wave-guided light into two output waveguides. A vacuum state of light, defined as the absence of photons of light, is coupled into both outputs as a result of this light-splitting process described by the laws of quantum physics. The light in the two waveguides output from the optical directional coupler are separately supplied to a pair of balanced photodetectors. Each photodetector outputs a photocurrent in response which is proportional to the light incident on it. The two photodetectors are in a balanced configuration. The configuration outputs an analogue signal that is proportional to the difference of the two constituent photodetectors. To a first order, the signal of the optical oscillator is cancelled at the output of the balanced photodetector. The analogue output signal is thus a random Gaussian-distributed signal representative of quadrature measurements on the quantum vacuum state of light. A physical description of this process can be found in T. Symul "Real time demonstration of high bitrate quantum random number generation with coherent light," *Applied Physics Letters* 98 231103 (2011).

The quantum random noise source enables a random bit generator particularly applicable to cryptographic applications. Such a random bit generator includes the quantum random noise source which provides an analogue electronic signal representative of quadrature measurements on the quantum vacuum state of light. A radio frequency filter is coupled to receive the analogue electronic signal and isolate a high-frequency portion of that signal, to thereby provide a high-frequency analogue electronic signal. This high frequency portion is further processed and provided to an analogue to digital converter to provide a random digital bit stream, which in turn may be further processed before use as a random bit digital signal. In a preferred embodiment, the further processing includes a conditioning component step to reduce any potential bias and/or increase the entropy rate of the resulting output.

DETAILED DESCRIPTION OF THE INVENTION

This invention provides an integrated quantum vacuum state of light-based quantum-random noise source. The invention generates an analogue electrical signal proportional to the quantum noise from quadrature measurements made on quantum vacuum states of light. The quadratures of the vacuum states of light are measured using a balanced optical homodyne detector, which includes the electro-optical components: an optical oscillator, an optical directional coupler, and a pair of balanced photodetectors. These components are integrated (or hybrid integrated) onto a substrate and coupled together with waveguides formed on the substrate. The analogue electronic output signal from the resulting apparatus is a nondeterministic, random, Gaussian-distributed signal representative of the outcomes of the quadrature measurements made on the quantum vacuum state of light. The output from the quantum-random noise source can be used to provide a source of random digital bits, as also described herein.

Quantum random numbers can be generated from the measurement outcomes of quadrature measurements made on quantum vacuum states of light, where quantum vacuum states of light are defined as the absence of light or photons. We use quadrature herein as referring to either the amplitude quadrature or phase quadrature or combinations thereof. Here we make quadrature measurements of quantum vacuum states of light using a balanced optical homodyne detector. The homodyne detector includes: a local optical oscillator source, an optical directional coupler, a balanced photodetector, and the necessary waveguides to couple them together. The output signal from the balanced optical homodyne detector is proportional to the quadrature measurements of the quantum vacuum states of light and that output is random, nondeterministic and Gaussian-distributed noise.

Quantum-random number sources that are based on measuring quantum vacuum states of light are known, but have a large footprint, high power consumption and high cost. These disadvantages preclude their use in many applications. Our invention overcomes these disadvantages by providing a quantum random noise source which has a smaller footprint and is a smaller form-factor device. Our quantum random noise source consumes less power, and is available at lower cost.

Figure 1:
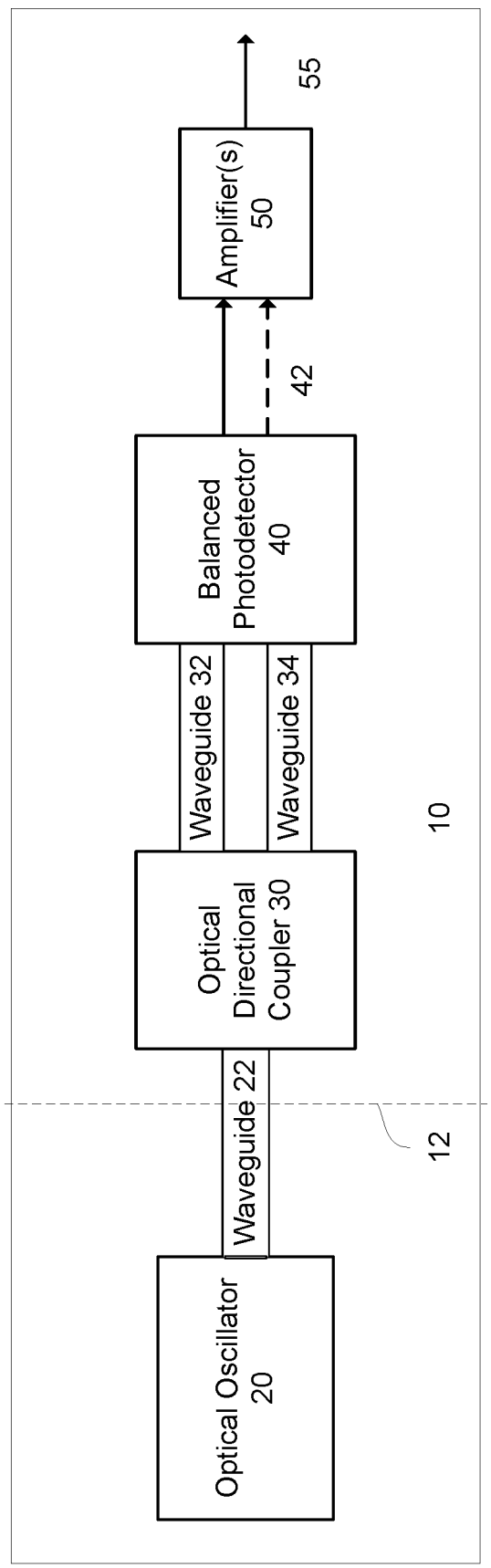
FIG. 1 is a block diagram of a quantum random noise source.

FIG. 1 is a block diagram illustrating a preferred embodiment of the invention. The integrated quantum vacuum state of light-based quantum-random noise source consists of a substrate 10, an optical oscillator source 20, an optical directional coupler 30 and a pair of balanced photodetectors 40, all coupled together by waveguides formed on the surface of the substrate. In a preferred embodiment, each of the electro-optical components is integrated, or hybrid-integrated, onto a substrate 10. The substrate 10 is preferably a semiconductor silicon (Si) wafer, a silicon-on-insulator (SOI) wafer, or other suitable substrate material used for fabricating optical devices, for example, indium phosphide (InP).

Figure 3:
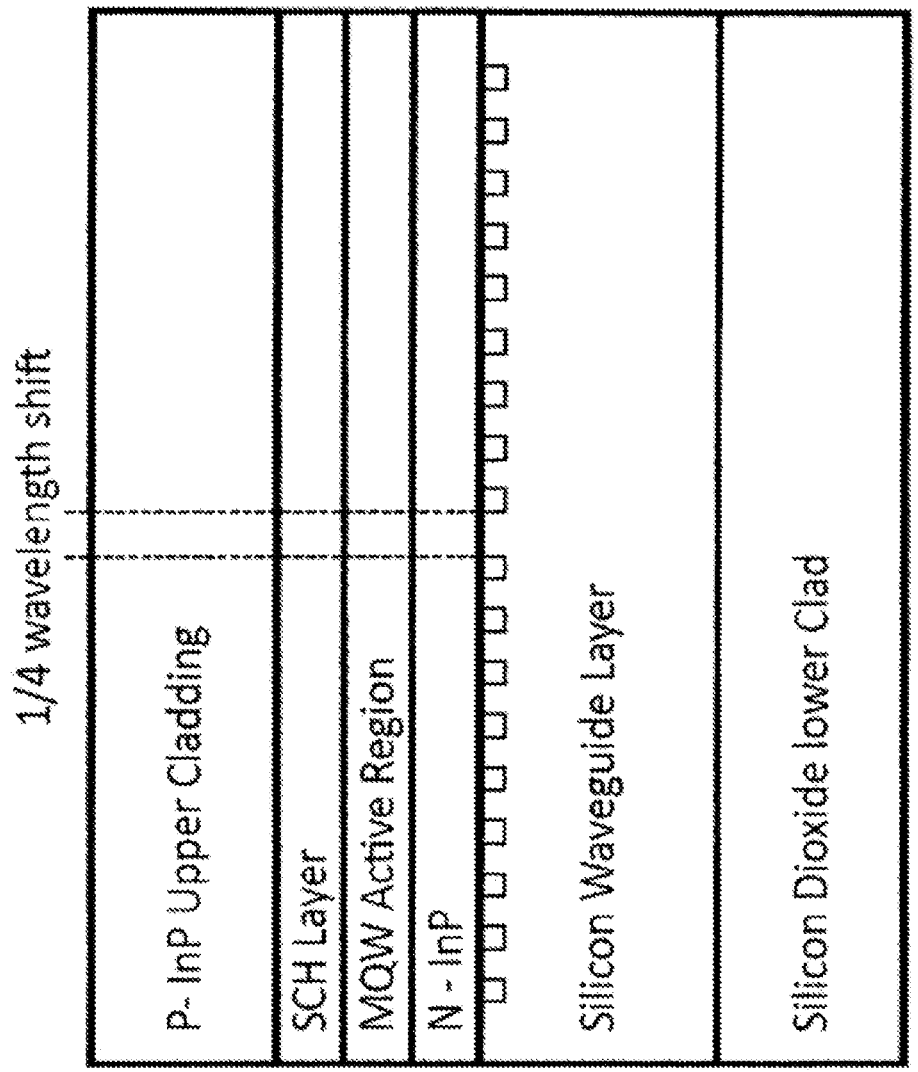
FIG. 3 is a cross-sectional view of a semiconductor laser as incorporated on a substrate.

In FIG. 1, the optical oscillator source 20 generates light, and transmits it through an optical waveguide 22. The optical source 20 is preferably a hybrid-integrated group III-V semiconductor laser. Hybrid silicon lasers can be fabricated by placing a III-V active layer in close proximity to a passive silicon waveguide. The light is guided by the silicon waveguide and evanescently couples to the III-V active layer. This achieves gain provided by the III-V active materials. A preferred embodiment of the laser is a distributed feedback (DFB) silicon evanescent laser. A distributed feedback cavity structure can achieve favorable laser characteristics: high side-mode suppression and narrow laser linewidth. One implementation of such a laser, and the manner of fabrication is described in A. W. Fang, et al. "A distributed feedback silicon evanescent laser," *Opt. Express* 16, 4413-4419 (2008). FIG. 3 illustrates the cross-section of such a laser.

In an alternate embodiment the optical oscillator source 20 is separate from the substrate 10. This embodiment is illustrated by the dashed line 12 dividing substrate 10 into two portions. In this embodiment, the separate optical oscillator may be coupled to the waveguide 22 by coupling the optical fiber output from the optical oscillator to a grating coupler that is coupled to the waveguide 22. In an alternative approach, the separate optical oscillator may be coupled directly to the waveguide 22 using butt-coupling techniques. Separating the oscillator source 20 from the remainder of the components on substrate 10 enables a wider choice of the types of, and structure used to provide the optical oscillator. For example, moving the oscillator off the substrate 10 enables a non-semiconductor laser to be used as the light source for the apparatus illustrated in FIG. 1.

Whether the laser is on the substrate 10, or separate from it, the laser emissions are provided to a waveguide 22 which conveys them to optical direction coupler 30. The waveguide can be formed using conventional semiconductor processing technology, for example, by forming ribs on the surface of the semiconductor which provide total internal reflection of the laser light. One implementation for such, and their manner of fabrication is described in L. Viven et al., "Polarization-independent single-mode rib waveguides on silicon-on-insulator for telecommunication wavelengths," *Optics Communications* 210, 43-49 (2002).

Optical direction coupler 30 splits the input light from waveguide 22 into two output optical waveguides 32 and 34. A preferable implementation is a 3 dB optical directional coupler that splits the input equally into the two output optical waveguides. A vacuum state of light, defined as the absence of photons of light, is coupled into both outputs as a result of this light-splitting process as described by the laws of quantum physics. Optical directional couplers can be formed using conventional semiconductor processing technology, for example, by forming two rib waveguides in close proximity to each other to enable coupling between the two waveguides. One implementation for such, and their manner of fabrication is described in B. Jalali et al., "Guided-wave optics in silicon-on-insulator technology," *IEEE Proceedings Optoelectonics* 143, 307 (1996).

The light is guided from the optical directional coupler 30 by optical waveguides 32 and 34 to balanced photodetector 40. The optical waveguides 32 and 34 are preferably formed directly on the substrate 100, for example, as silica waveguides on a silicon substrate 100 in the same manner as waveguide 22.

The light in the optical waveguides 32 and 34 is detected using a balanced photodetector 40. The balanced photodetector 40 is comprised of two independent photodiodes which detect the light transmitted in waveguides 32 and 34 respectively. In a preferable configuration for the balanced photodetector 40, the two photodiodes are in a push-pull configuration which outputs a photocurrent proportional to the difference of the individual photocurrent output by the two photodiodes.

In one preferable configuration, the output photocurrent is converted to a voltage using a transimpedance amplifier or equivalent current-to-voltage converter device. If a transimpedance amplifier is used, it can be bonded to substrate 10 using flip-chip bonding or similar bonding techniques. In an alternative configuration of the balanced photodetector 40, the outputs of both photodiodes are each coupled to independent transimpedance amplifiers, or equivalent current-to-voltage converter devices. This configuration is represented by the combined solid and dashed lines between balanced photodetector 40 and amplifiers 50. The resulting output voltage signals are both input into a 180-degree hybrid junction or equivalent device that outputs a voltage signal that is the difference of the two input voltages.

The output from the balanced photodetector 40, is a voltage signal that is proportional to the difference between the two photocurrents output from the two photodiodes which detected the light in waveguides 32 and 34. Assuming the optical directional coupler 30 has divided the light equally into two parts and the photodetectors are balanced, the difference signal between the two constituent photodetectors will have a mean of zero such that, to first order, the signal of optical oscillator is cancelled. The resulting analogue output is thus a random, zero-mean, Gaussian-distributed voltage signal that is representative of quadrature measurements on the quantum vacuum state of light.

Figure 4:
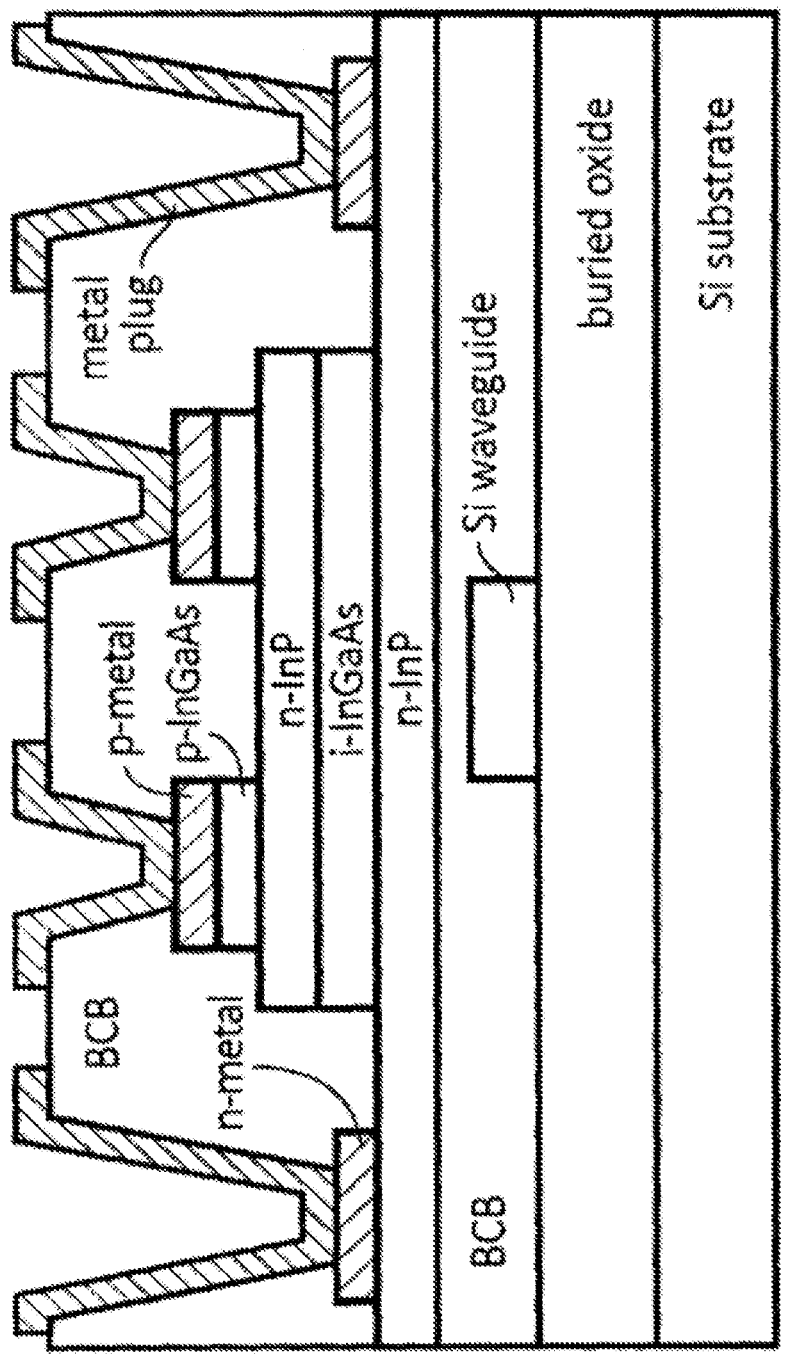
FIG. 4 is a cross-sectional view of a photodetector incorporated on the substrate.

In a preferred embodiment the individual photodetectors in the balanced photodetector 40 are InGaAs PIN photodetectors hybrid integrated with the silicon waveguides, as shown in FIG. 4. A description of these type photodetectors can be found at: Z. Sheng et al. "InGaAs PIN photodetectors integrated on silicon-on-insulator waveguides," *Opt. Express* 18, 1756-1761 (2010).

Figure 2:
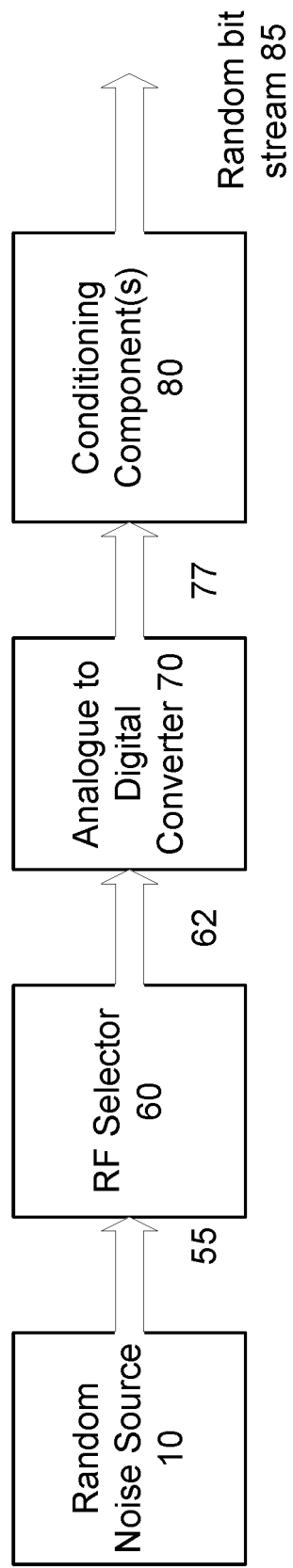
FIG. 2 is a block diagram of an apparatus using the quantum random noise source to provide a random bit generator.

FIG. 2 illustrates use of the random noise source 10, described above, in a system in which the random number noise 10 is used as the entropy source for a random bit generator. In this application, the quantum random noise generator is used to generate a nondeterministic, random sequence of digital bits which can be used, for example, in cryptographic applications. An example of such a cryptographic application can be found in commonly assigned PCT patent application entitled: "QKD Key Management System," serial number PCT/AU2012/000390, filed Apr. 16, 2012. A description of a entropy sources, such as a quantum random noise source, being used for random bit generation is also described in E. Barker and J. Kelsey "Recommendations for the Entropy Sources Used for Random Bit Generation" NIST DRAFT Special Publications 800-90B.

As shown in FIG. 2, the integrated quantum random noise source 10 outputs a Gaussian distributed, random analogue electrical signal 55, which ideally has a flat power-spectral density. Real-world imperfections in the components of the integrated quantum-random noise generator 10, however, may result in its output 55 exhibiting low-frequency technical noise, for example, due to an imperfect local oscillator light source. To avoid potential technical noise of the local oscillator light source 20, a high-frequency portion of the analogue electronic output signal 55 spectrum, which is below the finite spectral response of the photodetectors, is isolated using radio-frequency analogue electronics 60. This process preferably includes down-conversion, amplification and filtering of the analogue electronic signal 55 as described below.

After RF filtering 60, the processed analogue electronic signal 62 is digitized using an analogue-to-digital converter 70. This converts the analogue electrical signal 62 to a digitized signal 77.

The resulting digital signal 77 is passed into a conditioning component or components 80 that is a cryptographic algorithm used to post-process the output to remove any potential bias and or increase the entropy of the bits output from the conditioning component. Examples of NIST-approved conditioning components are described in the NIST document referred to above. As a result the output signal 85 is a sequence of nondeterministic random digital bits. This source of bits may be used, for example, in cryptographic applications as described in our co-pending patent application referenced above.

While the foregoing description of the invention enables one of ordinary skill to make and use what is considered presently to be the best mode of the invention, it can be appreciated that variations, combinations, and equivalents of the specific embodiment, method, and examples herein can be made. The invention should therefore not be limited by the above described embodiments, but is set forth in the claims below.

What is claimed is:

1. A random bit generator comprising:
a quantum random noise source providing an analogue electronic signal that is representative of quadrature measurements on a quantum vacuum state of light, the quantum random noise source comprising:
an optical oscillator that generates laser light that is coupled into an input waveguide;
an optical directional coupler having a single input and two outputs for receiving light from the input waveguide and dividing the light from the input waveguide into a first output and a second output; and
first and second photodetectors for receiving the first and second outputs, respectively, and providing first and second photocurrents;
wherein the first and the second photodetectors are in a balanced, push-pull configuration with each other and configured to provide an analogue output signal proportional to a difference of the first and second photocurrents from the first and second photodetectors;
a radio frequency filter coupled to receive the analogue electronic signal and isolate a high-frequency portion of the analogue electronic signal to thereby provide a high-frequency analogue electronic signal; and
an analogue to digital converter coupled to receive the high-frequency analogue electronic signal and convert it to a digital signal.

2. A random bit generator as in claim 1 further comprising a conditioning component coupled to receive the digital signal and apply a cryptographic algorithm to the digital signal.

3. A random bit generator as in claim 2 wherein the cryptographic algorithm increases entropy of the digital signal before providing a binary output signal.

4. A random bit generator as in claim 1 wherein the radio frequency filter provides down-conversion, amplification, and filtering of the analogue electronic signal.

5. A random bit generator as in claim 1 wherein the quantum random noise source is coupled to an optical oscillator for receiving light and further comprises a first waveguide to receive the first output of the optical direction coupler and a second waveguide to receive the second output of the optical direction coupler, and wherein the first photodetector is coupled to the first waveguide for receiving the light from the first output of the optical directional coupler and the second photodetector coupled to the second waveguide for receiving the light from the second output of the optical directional coupler.

6. A random bit generator as in claim 5 wherein the quantum random noise source further comprises a substrate, wherein the optical direction coupler, the first waveguide, and the second waveguide are formed on the substrate.

7. A random bit generator as in claim 6 wherein the first and second photodetectors are integral to the substrate.

8. A random bit generator comprising:
a quantum random noise source providing an analogue electronic signal that is representative of quadrature measurements on a quantum vacuum state of light, wherein the quantum random noise source is configured to receive laser light from an external laser source, the quantum random noise source comprising:
an external input for laser light from the external laser source that is coupled into an input waveguide;
an optical direction coupler having a single input and two outputs for receiving light from the input waveguide and dividing the light from the input waveguide into a first output and a second output;

a first photodetector coupled to a first waveguide for receiving the first output of the optical direction coupler and providing a first photocurrent; and a second photodetector coupled to a second waveguide for receiving the second output of the optical direction coupler and providing a second photocurrent; wherein the first and the second photodetectors are in a balanced, push-pull configuration with each other and configured to provide an analogue output signal proportional to a difference of the first and second photocurrents from the first and second photodetectors.

9. A random bit generator as in claim 8 wherein the quantum random noise source further comprises a substrate, wherein the optical direction coupler, the first waveguide, and the second waveguide are formed on the substrate.

10. A random bit generator as in claim 9 wherein the first and second photodetectors are integral to the substrate.

11. A random bit generator as in claim 8 wherein:
the first photodetector provides a first photocurrent output signal;
the second photodetector provides a second photocurrent output signal; and
the analogue electronic signal comprises a random Gaussian-distributed (RG) signal proportional to the difference of the first photocurrent output signal and the second photocurrent output signal.

12. A random bit generator as in claim 11 wherein the analogue electronic signal is representative of quadrature measurements on quantum vacuum states of light.

13. A method of providing a signal having a stream of random bits comprising:
receiving, from a quantum random noise source, an analogue signal representing a nondeterministic, random, Gaussian-distributed representation of outcomes of quadrature measurements made on a quantum vacuum state of light, wherein the quantum random noise source comprises:
an optical oscillator that generates laser light that is coupled into an input waveguide;
an optical directional coupler having a single input and two outputs for receiving light from the input waveguide and dividing the light from the input waveguide into a first output and a second output; and
first and second photodetectors for receiving the first and second outputs and providing first and second photocurrents, respectively;
wherein the first and the second photodetectors are in a balanced, push-pull configuration with each other and configured to provide an analogue output signal proportional to a difference of the first and second photocurrents from the first and second photodetectors;

filtering the analogue signal to extract a high-frequency analogue signal;

converting the high-frequency analogue signal to a base-band analogue signal;

digitizing the base-band analogue signal to provide a digitized signal; and post-processing the digitized signal with a conditioning component to increase entropy in a resulting output signal.

14. A method as in claim 13 further comprising applying a cryptographic algorithm to the digitized signal in the conditioning component to increase entropy of the digitized signal.

15. A method as in claim 13 wherein filtering the analogue signal comprises using a radio frequency filter that provides down-conversion, amplification, and filtering of the analogue signal.

16. A method as in claim 13 wherein the quantum random noise source is coupled to an optical oscillator for receiving light and further comprises a first waveguide to receive the first output of the optical direction coupler and a second waveguide to receive the second output of the optical direction coupler, and wherein the first photodetector is coupled to the first waveguide for receiving the light from the first output of the optical directional coupler and the second photodetector coupled to the second waveguide for receiving the light from the second output of the optical directional coupler.

17. A method as in claim 16 wherein the quantum random noise source further comprises a substrate, wherein the optical directional coupler, the first waveguide, and the second waveguide are formed on the substrate.

18. A method as in claim 17 wherein the analogue signal is representative of quadrature measurements on the quantum vacuum state of light.

* * * * *